J. E. STRIETELMEIER.
WHEEL.
APPLICATION FILED DEC. 14, 1910.
1,019,101.
Patented Mar. 5, 1912.
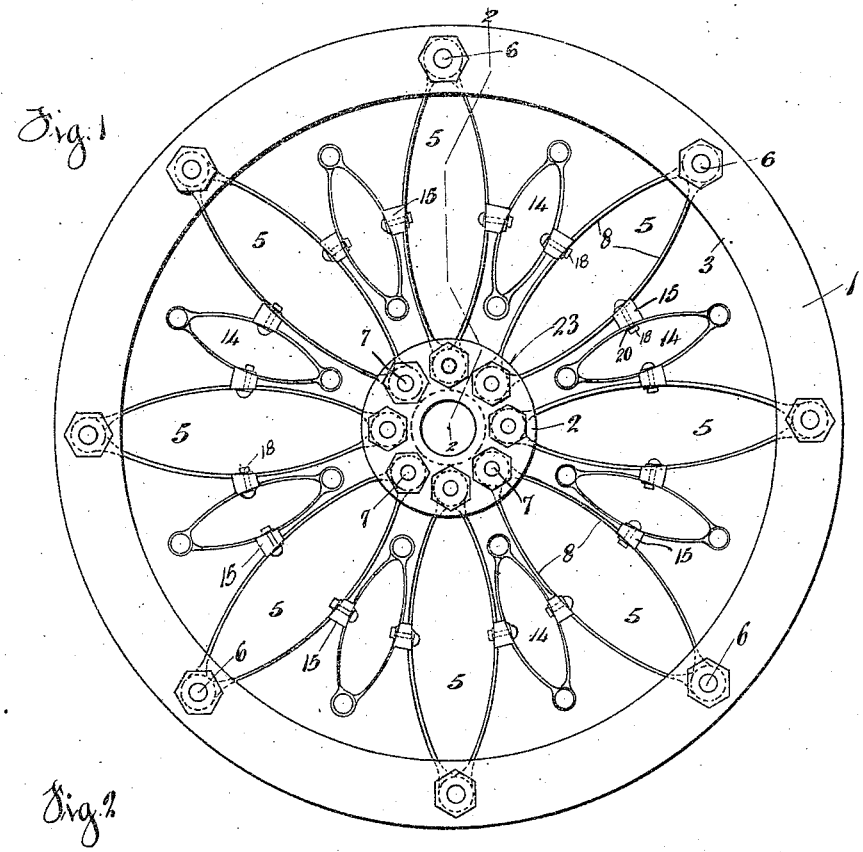
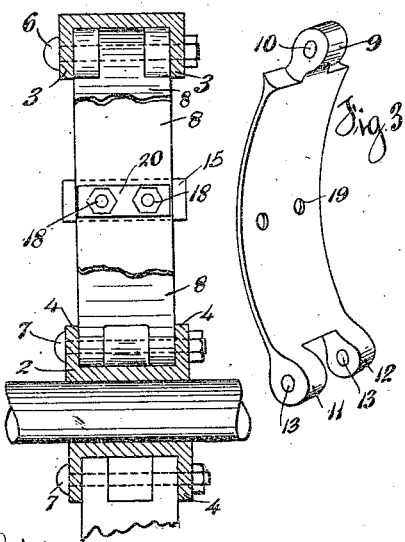
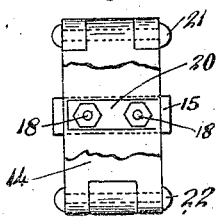
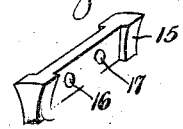
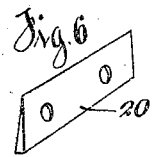

UNITED STATES PATENT OFFICE.

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

WHEEL.

1,019,101.          Specification of Letters Patent.          Patented Mar. 5, 1912.

Application filed December 14, 1910. Serial No. 597,286.

*To all whom it may concern:*

Be it known that I, JOHN E. STRIETELMEIER, a citizen of the United States, residing at Cincinnati, in the county of Hamilton and State of Ohio, have invented certain new and useful Improvements in Wheels, of which the following is a specification.

My invention relates to wheels, and more particularly to means for reducing the force of jars and jolts on the rim thereof.

The object of my invention is to produce a wheel which may have a solid rim or tread surface and still possess sufficient strength and resiliency to take up any jars and jolts upon the rim and reduce them to a minimum before they reach the main body of the vehicle which the wheel is adapted to support.

Another object of my invention is to provide a wheel of sufficient resiliency between the hub and rim having a cushioned tread that the jars and shocks against said cushioned tread will be distributed throughout the wheel, and thereby lessen the damage or wear to the cushioned rim, as well as to minimize the jars to the vehicle.

Another object of my invention is to produce a wheel such as a pulley wheel having a solid rim with resilient means between the hub and rim whereby the belting may be subjected to excessive and sudden strains during certain intervals of its revolutions for machinery of varying loads, reducing any jarring effect upon the machinery or belting, such jarring effects being distributed and equalized by said resilient means.

My invention consists of a wheel comprising a rim, a hub, elliptical springs forming spokes extending radially from said hub to said rim, and springs connecting said spokes between their ends to equalize and distribute the contraction and expansion of said elliptical spokes and to strengthen the resilient parts of the wheel.

My invention also consists in providing elliptical springs having free ends and connected near their central parts to the elliptical spokes near their centers.

My invention also consists in pivotally connecting said elliptical spokes to the rim and to the hub.

My invention also consists in the details of construction and arrangement and in the parts and combination and arrangement of parts as herein set forth and claimed.

In the accompanying drawing which serves to illustrate my invention: Figure 1 is a side elevation of a wheel constructed in accordance with my invention. Fig. 2 is a cross section taken on the line 2—2 of Fig. 1. Fig. 3 is a perspective view of one of the curved plates of the elliptical springs employed in my invention. Fig. 4 is a side elevation of one of the small intermediate elliptical springs employed in my invention. Fig. 5 is a perspective view of one of the spacing blocks adapted to space the intermediate springs from the larger elliptical springs. Fig. 6 is a perspective view of one of the wedge shaped washers adapted to be used in connection with the spacing blocks shown in Fig. 5.

In the embodiment of my invention as illustrated and which shows a preferred construction, 1 represents the rim of a wheel made of any suitable material and may be adapted to receive either a solid or pneumatic rubber tire on the outer surface thereof if desired, and 2 represents the hub of the wheel. The rim 1 is provided with inwardly extending flanges 3 and the hub 2 is provided with outwardly extending flanges 4. Elliptical springs 5 forming spring spokes are pivoted to the hub and rim of the wheel by means of bolts 6 and 7.

The springs or spokes 5 are each composed of two curved plates 8. One of the curved plates 8 is illustrated in Fig. 3 and is provided with a centrally located lug 9 at one end thereof, said lug having a transverse opening 10 therein adapted to receive either of the bolts 6 or 7. The other end of the plate 8 is provided with two lugs 11 and 12 spaced apart and having transverse holes 13 therein for the purpose of receiving either of the bolts 6 or 7. Each curved plate is formed substantially as shown in Fig. 3 and each pair of plates forming an elliptical spring spoke are placed together in such a manner that the lug 9 of each plate will fit between the lugs 11 and 12 of the corresponding plate, so that when they are thus bolted together and to the rim and hub respectively, they will form elliptical spring spokes. Small intermediate springs 14 also of the elliptical type are placed between the elliptical spring spokes 5 for the purpose of distributing and equalizing the contractive and expansive movements of the spring spokes, and of strengthening and securely binding together and uniting the resilient parts of said wheel. These intermediate elliptical springs 14 are constructed in precisely the same manner as the large elliptical spring spokes 5, the ends of said springs 14 however, being free. The plates of the small elliptical springs 14 are constructed like the plate shown in Fig. 3, the ends of same being connected together by means of bolts or rivets 21 and 22, as shown in Fig. 4.

The elliptical springs 14 having both ends free, are placed between the spring spokes and separated therefrom by spacing blocks 15, which are bolted between said springs and spokes, and are provided with suitable holes 16 and 17 through which bolts 18 are adapted to pass. The spacing blocks 15 are adapted to be placed at the longitudinal center of the plates of the springs, the plates of the springs being provided with holes 19 adapted to receive the bolts 18.

Owing to the elliptical construction of the springs, and also to their being radially disposed with relation to the hub, the spacing blocks 15 are of wedge shape construction. In order to cause the bolts 18 to pass through said spacing blocks and still have a flat surface for the head and nuts of same to bear against, I provide a thin wedge shaped washer 20, which is adapted to fit under the heads and the nuts of said bolts 18.

When pressure is brought to bear upon the rim 1 of the wheel, the elliptical spring spoke 5 which happens to be in the lowermost position will expand. At the same time the small intermediate elliptical springs 14 adjacent thereto will contract due to the expansion of said spring spoke 5. The elliptical spring spoke 5 diagonally opposite and in the uppermost position of the wheel will correspondingly contract, due to the movement of the hub 2 downwardly, causing the adjacent intermediate elliptical springs 14 to expand. These movements will affect all of the spring spokes 5 and intermediate springs 14 to a greater or less extent, causing contraction or expansion, as the case may be, so that each spring or spring spoke will contribute its share in taking up the pressure upon the lowermost spring spoke 5. Thus it is seen that whenever the large elliptical springs or spokes tend to contract, the small intermediate springs adjacent thereto will tend to expand and vice versa.

It is evident from the construction shown and described that one spring spoke 5 will not receive the entire strain of the pressure imparted to the rim of the wheel, but on the contrary, every spring in the wheel will contribute toward taking up the pressure brought to bear upon the rim of the wheel.

One of the greatest advantages derived from my invention is the fact that it could be readily placed on an automobile and would eliminate the jar or sudden start which is common to automobiles when a particular clutch is thrown into engagement; inasmuch as the hub of the wheel can readily rotate or twist a short distance before the rim begins to move, all due to the connection of the elliptical springs hereinbefore described.

It is evident that with the use of my invention pneumatic tires become unnecessary, and a solid rubber tire could be substituted, thereby saving a great expense in the cost of pneumatic tires, and also eliminating a vast amount of trouble arising therefrom. As heretofore stated my invention could also be placed with equally as much satisfaction on pulleys which are adapted to be stopped and started suddenly.

Modifications of my invention may be made without departing from its spirit and scope, and I do not wish to be confined to the exact details shown.

What I claim as new and desire to secure by Letters Patent is:

1. A wheel comprising a rim, a hub, a series of semi-elliptical spring spokes extending radially from said hub to said rim and a series of smaller semi-elliptical springs connected together in pairs at their ends, said pairs having their ends free and connected near their center to the adjacent spring spokes, substantially as set forth.

2. A wheel comprising a rim, a hub, a series of elliptical spring spokes extending radially from said hub to said rim, short semi-elliptical springs each having its ends secured to similar short semi-elliptical springs and secured between their ends to the adjacent spring spokes between their ends, said short semi-elliptical springs extending parallel of and between said spring spokes, substantially as set forth.

JOHN E. STRIETELMEIER.

Witnesses:
JAMES N. RAMSEY,
WINONA DOAN.